United States Patent [19]

Scotto

[11] Patent Number: 4,815,716
[45] Date of Patent: Mar. 28, 1989

[54] TELESCOPING STRUT SHOCK ISOLATOR

[75] Inventor: Dominick P. Scotto, Plainview, N.Y.

[73] Assignee: Unisys Corporation, Blue Bell, Pa.

[21] Appl. No.: 95,729

[22] Filed: Sep. 14, 1987

Related U.S. Application Data

[63] Continuation-in-part of Ser. No. 769,220, Aug. 26, 1985, abandoned.

[51] Int. Cl.$^4$ .......................................... B60G 17/00
[52] U.S. Cl. .............................. 267/64.16; 188/313; 188/322.21; 267/64.11; 267/64.25; 267/64.26
[58] Field of Search ............... 188/312, 313, 314, 316, 188/317, 322.19, 322.21, 284, 288; 267/64.11, 64.15, 64.16, 64.25, 64.26, 64.28; 280/6 R

[56] References Cited

U.S. PATENT DOCUMENTS

| | | | |
|---|---|---|---|
| 1,226,673 | 5/1917 | Kane | 188/314 |
| 2,299,216 | 10/1942 | Ericsson | 267/64.28 |
| 2,564,790 | 8/1951 | Orloff et al. | 267/64.28 |
| 2,856,180 | 10/1958 | Westcott, Jr. | 267/64.15 |
| 2,916,281 | 12/1959 | Hehn | 188/317 |
| 3,056,598 | 10/1962 | Conway et al. | 267/64.26 |
| 3,933,337 | 1/1976 | Morris et al. | 188/317 |
| 3,971,551 | 7/1976 | Kendall et al. | 188/317 |
| 4,099,602 | 7/1978 | Kourbestos | 188/314 |
| 4,153,266 | 5/1979 | Uhls | 188/314 |
| 4,284,178 | 8/1981 | Tomita et al. | 188/314 |

Primary Examiner—Andres Kashnikow
Assistant Examiner—Matthew C. Graham
Attorney, Agent, or Firm—Albert B. Cooper; Seymour Levine

[57] ABSTRACT

A shock isolator apparatus of the pressurized air type having a plurality of cylinder chambers and a piston positioned for movement in the cylinder chambers. An air passage tube axially located in the piston permits air to flow between one end of the piston extending into a first end chamber in the cylinder and a chamber formed in the piston at an end opposite the one end. Air communication between the end chamber, the chamber formed in the piston, and a second end chamber in the cylinder is accomplished by air bypass ports extending between the air passage tube and the second chamber. Unidirectional pressurized valves positioned between chambers of the cylinder operate to equalize the pressure distribution throughout the cylinder.

5 Claims, 2 Drawing Sheets

TELESCOPING STRUT SHOCK ISOLATOR

This application is a continuation-in-part of co-pending application Ser. No. 769,220, now abandoned.

BACKGROUND OF THE INVENTION

1. Field of the Invention

The present invention relates to an apparatus for shock isolation and more particularly to sliding piston telescoping strut apparatus.

2. Description of the Prior Art

Conventional shock isolation devices, particularly for naval applications, consist typically of damped springs or resilient elements interposed between the ship structure and the equipment to be isolated from shock. Damped springs in various forms are generally satisfactory for protecting equipment that is not alignment sensitive. Where equipment to be protected from shock is alignment sensitive, (for example, radar antenna systems or inertial guidance systems) various types of latched linkages and guided carriages are used in conjunction with springs and resilient elements to restore alignment after a shock has been experienced.

The present telescoping shock isolator invention provides superior shock protection. The protected structure experiences only a moderate controlled acceleration during the entire shock cycle. Alignment is kept kinematically rigid by compressed air when no shock is being experienced. During shock above a predetermined threshold, the invention yields axially and allows controlled acceleration of the protected structure. The protected structure is returned to its precise original position when the shock falls below the predetermined threshold.

SUMMARY OF THE INVENTION

A shock isolator in accordance with the present invention has a latching chamber, buffer chamber, lower air reserve chamber, and a piston with upper and lower piston heads movable within the latching and buffer chambers, respectively. A hollow axial cylinder in the piston extends from an upper air reserve chamber, having the upper piston head as a base and movable therewith, to the lower air reserve chamber. Openings at both ends permit free passage of air between the air reserve chambers, while orifices in the hollow cylinder permit air communications between the air reserve chambers and the latching chamber. Air communication between the buffer chamber, the latching chamber, and lower air reserve chamber are provided by bleed orifices in cylinder heads positioned between the chambers. Check valves in the upper piston head and in the cylinder head between the latching and buffer chambers facilitate the passage of air from the latching chamber to the upper reserve chamber and to the buffer chamber at predetermined pressure conditions. The lower piston head creates two sub-chambers of variable volume in the buffer chamber. Air flow between the two sub-chambers is controlled by cup seals at the periphery of the lower piston head and valves, check and throttle, through the lower piston head.

This cylinder and piston arrangement provides controlled acceleration of the piston when dislodged from its latched position when a compressive shock load above a predetermined amplitude is received and permits the piston to reset to the latched position when the compressive shock load subsides to an amplitude below the predetermined amplitude.

DESCRIPTION OF THE PREFERRED EMBODIMENT

Figure 1:
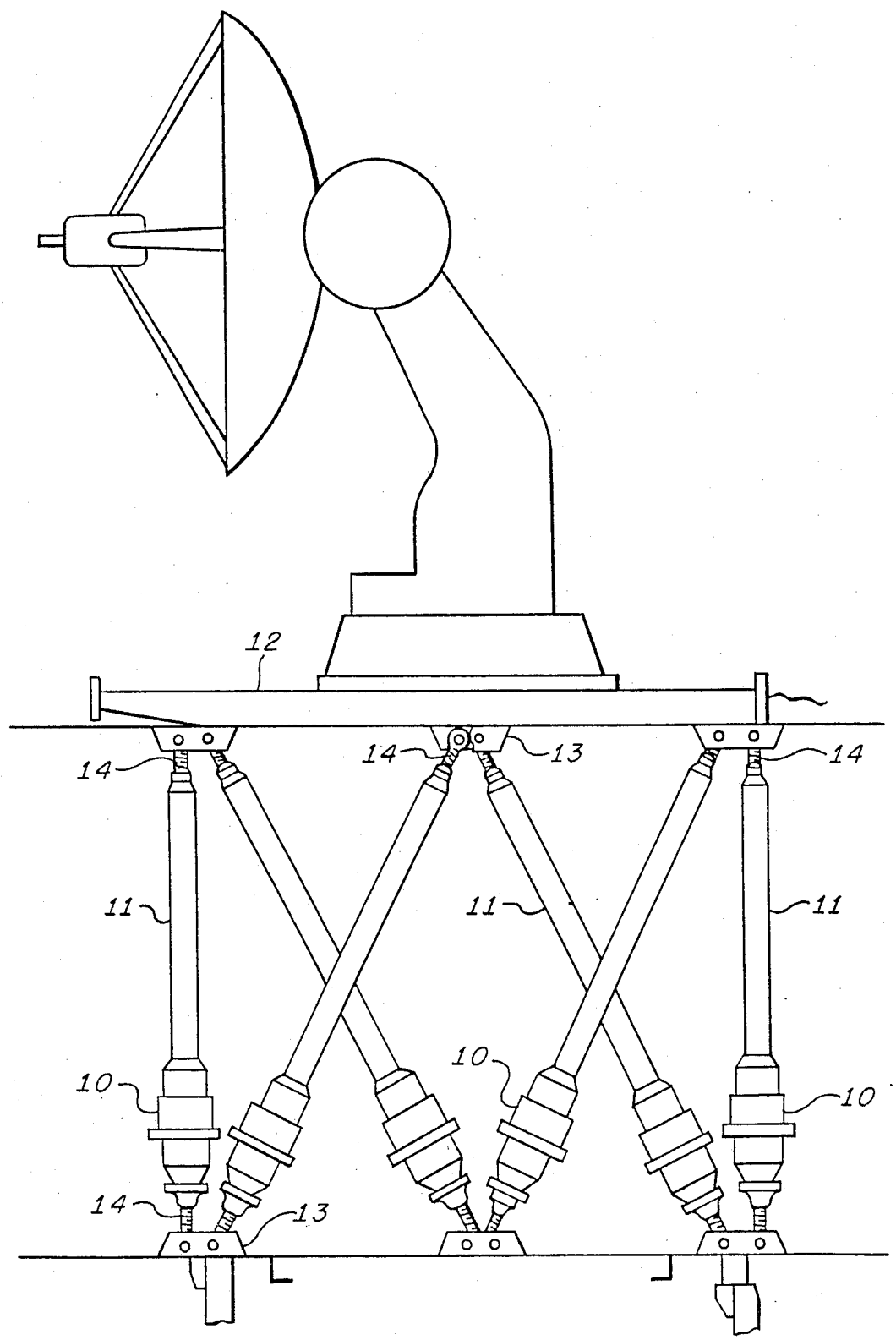
FIG. 1 illustrates one application of the present shock isolator invention, support of an alignment sensitive platform.

FIG. 1 illustrates shock protection of a radar antenna using the present invention. The system comprises six telescoping shock isolators 10 and spacers 11 of the appropriate height for the platform 12 to be protected. All six shock isolator 10/spacer 11 units are identical having ball joints 13 at each end and a screw type level adjuster 14. By changing the length of spacer 11 the shock isolator 10 may be adapted to a variety of applications. Arranging the shock isolator 10/spacer 11 units in six triangles as shown in FIG. 1 imparts kinematic rigidity along and around the three major axes of a standard orthogonal reference system. This rigidity is maintained when the length of each shock isolator 10/spacer 11 unit is held constant. The shock isolators 10 yield axially when subjected to a compressive load above a predetermined release threshold and then return precisely to their original length when the compressive loas falls below the predetermined release threshold. The original alignment of platform 12 is thereby accurately restored.

Figure 2:
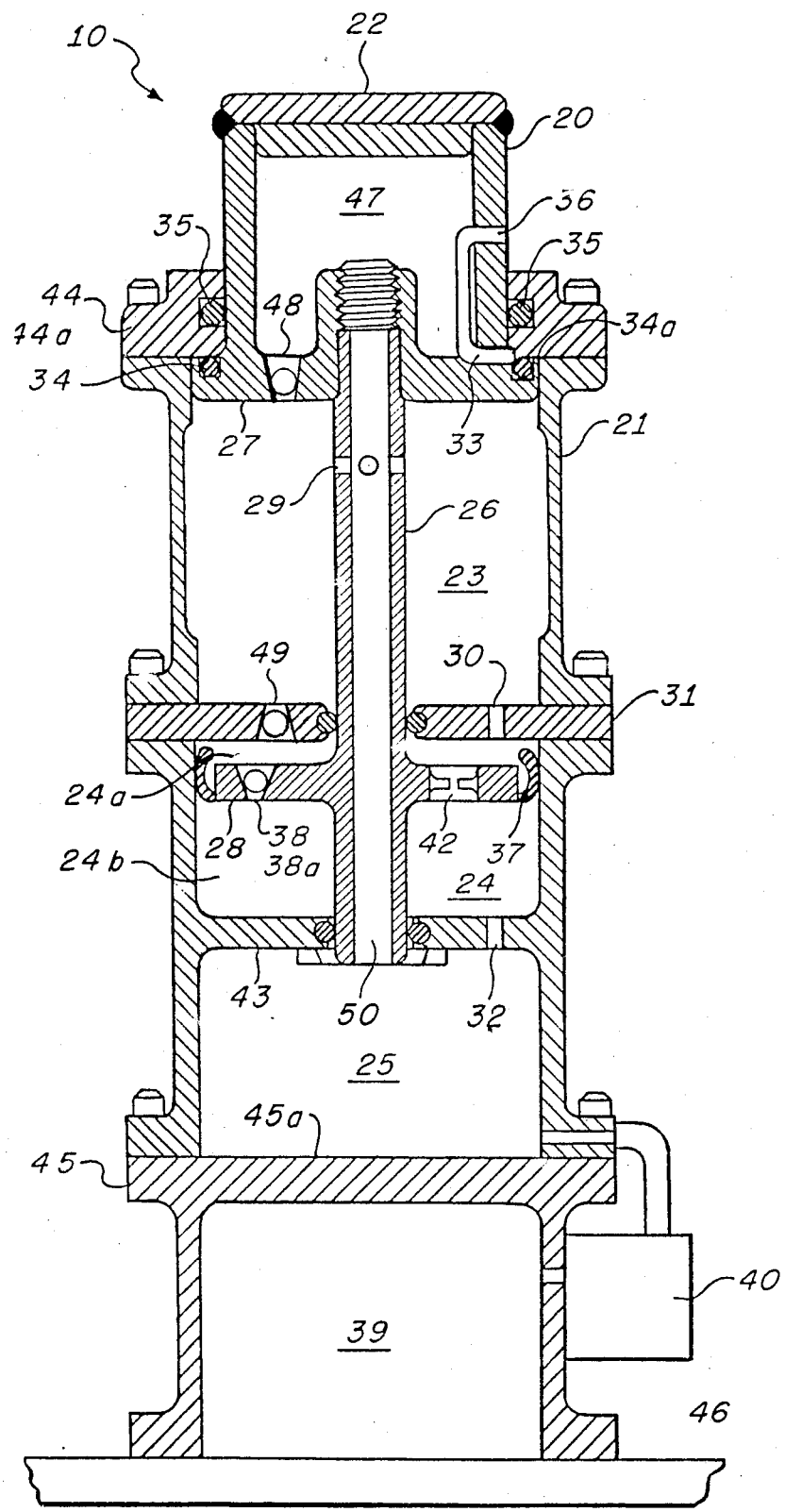
FIG. 2 is a cross-section view of the present shock isolator invention.

The construction of shock isolator 10 will be described with reference to FIG. 2. Shock isolator 10 includes a hollow piston 20 fitted within cylinder 21. The top of the piston 20 may be attached to spacer 11 in FIG. 1 or directly to the platform or load to be isolated 22. Cylinder 21 is divided into three chambers: latching chamber 23 formed between a primary cylinder head 34a established by a surface of flange 44 forming a primary cylinder head 44a and a first intermediate cylinder head 31, buffer chamber 24 formed between intermediate cylinder head 31 and a second intermediate cylinder head 43, lower reserve air chamber 25 formed between the second intermediate cylinder head 43 and a base cylinder head established by one surface 45a of an upper wall of an air storage tank 39. A hollow piston guide tube 26 attached to piston 20, supports buffer piston head 28 and couples lower reserve air chamber 25 to upper reserve air chamber 47 formed in piston 20, via a hollow cylinder 50 in the piston guide tube 26. A one way flow valve 48 is fitted between chamber 23 and chamber 47 to allow air flow between chamber 23 to chamber 47. Upper piston head 27 of piston 20 contains a primary gasket seal 34 which is a controlled confinement polymer of the crown and grove type and is mechanically and chemically bonded to upper piston head 27. The portion of piston guide tube 26 passing through latching chamber 23 has air bypass ports 29 which provide an air passage between lower reserve air chamber 25 and upper reserve air chamber 47 to latching chamber 23. In the latched position shown in FIG. 2, all chambers 23, 24, 25, and 47 are at the same pressure due to the internal porting provided by air bypasss ports 29, bleed orifice 30, and valve 49 in intermediate cylinder head 31, ball check valve 48 in the upper piston head 27, and bleed orifice 32, in the intermediate cylinder head 43, and throttle orifice 42 in buffer piston head 28.

The volume 33 between the primary face seal 34 and the upper piston rod running seal 35 in the flange 44 is vented to the atmosphere through piston rod seal bypass 36. Buffer piston head 28 has cup seal 37 around its periphery and contains ball check valves 38. The primary source of pressurized air for shock isolator 10 is contined in the integral high pressure air storage tank 39 at a pressure that is higher than working pressure. This high pressure air storage tank 39 is formed between the upper wall 45 and a surface 46 which is subject to shock, as for example, the deck of a vessel. The cylinder 21 is connected to the upper wall 45 of the high pressure air storage tank 39, and as a consequence thereof follows the motion of the surface 46. Air is fed into air reserve chamber 25 through regulator 40 which provides a working pressure to air reserve chamber 25.

Operation of shock isolator 10 will now be described. Shock isolator 10 as shown in FIG. 2 is in the pressurized latched state. Air pressure is uniform throughout chambers 23, 24, 25, and 47 which forces primary seal 34 against primary cylinder head 34a, thereby establishing a latching preload $L_L$. If a load 22 of mass W/g is attached to piston 20, the reaction force $F_R$ supplied by the cylinder 21 at banking surface 34a is $F_R = L_L - W$ when the acceleration of the piston $A_P = 0$. If the banking surface 34a restraint were removed, the piston 20 would experience an acceleration $A_{pL} = F_p \times G$ where $A_{PL}$ is the piston latching acceleration. Therefore, any acceleration of cylinder 21 that is less than the latching acceleration $A_{PL}$ of piston 20 allows the piston 20 and cylinder 21 to remain in contact at banking surface 34a. Piston 20 will lag cylinder 21, when cylinder 21 is subjected to a linear acceleration along the axis of symmetry of the isolator that is greater than $A_{PL}$, as would occur when the deck 46 is subjected to affects of an underwater explosion. When the piston 20 displacement is sufficient to open the gasket seal 34, for example 0.015 to 0.030 inches, pressurized air from latching chamber 23 will flow behind piston head 27 and the piston 20 acceleration will decrease slightly. The piston 20 is now in its unlatched state. Pressurized air will not escape, because, as the primary rod seal 34 opens, the piston rod bypass tube 36 moves past piston rod seal 35, thus preventing any escape of pressurized air.

During this compression stroke the volume of the upper section 24a of the buffer chamber 24 increases, tending to lower the pressure therein. When the pressure in the chamber 23 exceeds that in the upper section 24a, check valve 49 opens, permitting air to flow more freely from chamber 23 to upper section 24a, thereby equalizing the pressure in the two chambers. This action and the free flow of air between chambers 23, 24, 25, and 47 permitted by air bypass ports 29, check valve 48, air passage cylinder 50 in piston guide tube 26, and bleed orifice 32, tends to maintain uniform constant pressure throughout the unit.

When piston 20 is unlatched, ball check valves 38 opens, cup seal 37 collapses, and pressurized air moves freely between the upper section 24a and lower section 24b of buffer chamber 24, causing the force accelerating piston 20 to drop to the initial reset force, which is equal to the area of the latching ledge 27 times the operating pressure in the cylinder 21. The piston 20 thus accelerates upward under the influence of the operating air pressure from below. This acceleration continues until the piston 20 velocity reaches that of the cylinder 21. During the piston 20 acceleration relatively unrestricted passage of air flows between chambers 23, 24, 25, and 47. When the piston 20 velocity and the cylinder 21 velocity match, the relative displacement of the piston and cylinder will be at a maximum. After this velocity match is reached, the velocity of the piston 20 continues to increase while the velocity of the cylinder 21 decreases. Soon, the piston leads the cylinder and the directional valves close, causing the pressure to build in the upper section of the latching chamber 24a. This action causes a back pressure which decelerates the piston 20 until its velocity once again matches the velocity of the cylinder 21. At this time the relative velocity of the piston 20 and cylinder 21 again reverses and the acceleration sensetive directional valve 38 opens, equalizing the pressures in the upper buffer chamber 24a and the lowerbuffer chamber 24b. This cyclic action continues until reset occurs.

As the reset cycle begins, piston 20 is moving faster than cylinder 21. Check valves 38 close and cup seals 37 press against the walls of cylinder 21 thereby sealing upper section 24a of buffer chamber 24 except for a small amount of air passing through a throttle orifice 42. Pressure will continue to rise in upper section 24a of buffer chamber 24 as piston 20 moves upward toward the latched position. By proper selection of the size of throttle orifice 42 and bleed orifices 30 and 32, piston 20 will arrive at the latched position shown in FIG. 1 when cylinder 21 and piston 20 have a near zero relative velocity. Once primary seal 34 contacts banking surface 34a, shock isolator 10 is latched and held in position by pressurized air within latching chamber 23.

While the invention has been described in its preferred embodiments it is to be understood that the words which have been used are words of description rather than limitation and that changes may be made within the purview of the appended claims without departing from the true scope and spirit of the invention in its broader aspects.

I claim:

1. A shock isolator apparatus containing pressurized air comprising:

a cylinder having a first, second, and third chambers, said first chamber positioned between a primary cylinder head, having a central opening therethrough disposed at a first end of said cylinder and a first intermediate cylinder head disposed within said cylinder at a predetermined distance from said primary cylinder head, said second chamber positioned between said first intermediate cylinder head and a second intermediate cylinder head disposed within said cylinder a predetermined distance from said first intermediate cylinder head, said first and second intermediate cylinder heads having a central opening and orifices therethrough, said third chamber positioned between said second intermediate cylinder head and a baseplate affixed to a second end of said cylinder;

a piston assembly fitted within said cylinder having a hollow piston guide tube fixedly attached to first and second piston heads that are adapted to move within said first and second chambers, respectively, upon application of a compressive load to said piston assembly, said first piston head latched to said first cylinder head absent said compressive load, said second piston head dividing said second chamber into a first sub-chamber adjacent said first chamber and a second sub-chamber adjacent said third chamber and having valves operable to open when pressure in said second sub-chamber is greater than pressure in said first subchamber thereby permitting air to flow therethrough and to close at a pressure in said second sub-chamber that is less than pressure in said first sub-chamber said valves being closed when said piston and said cylinder are at equal pressures said, hollow piston guide tube extending from an end in said third chamber through said first and second chambers to an end in a chamber formed in said piston adjacent said first piston head and having openings in said ends and opening to said first chamber for air communication between said first chamber, said third chamber and said chamber formed in said piston.

2. A shock isolator apparatus according to claim 1 further comprising:
   a high pressure air storage container,
   a regulator coupled between said air storage container and said third chamber for providing said cylinder with a predetermined operating pressure.

3. A shock isolator apparatus according to claim 1 further comprising:
   cup valves disposed at the periphery of said second piston head for permitting passage of air between said first and second sub-chambers when pressure in said second sub-chamber exceeds pressure in said first sub-chamber.

4. A shock isolator apparatus in accordance with claim 1 wherein said first piston head includes valves for permitting air flow between said fist chamber and said chamber formed in said piston when pressure in said first chamber exceeds pressure in said chamber formed in said piston.

5. A shock isolation apparatus according to claim 4 wherein said first intermediate cylinder head has valves therein operable to open when pressure in said first chamber is greater than pressure in said first sub-chamber.

* * * * *